US007154754B2

(12) United States Patent
Barsun et al.

(10) Patent No.: US 7,154,754 B2
(45) Date of Patent: Dec. 26, 2006

(54) MODULAR VOLTAGE REGULATOR

(75) Inventors: Stephan Karl Barsun, Sacramento, CA (US); Gary W. Williams, Rowlett, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 105 days.

(21) Appl. No.: 11/027,169

(22) Filed: Dec. 29, 2004

(65) Prior Publication Data

US 2006/0139888 A1 Jun. 29, 2006

(51) Int. Cl.
*H02J 1/00* (2006.01)

(52) U.S. Cl. ........................ 361/715; 361/18; 361/732; 361/803; 363/146; 363/147; 307/33

(58) Field of Classification Search .................. 361/18, 361/683, 103, 731, 788, 752, 728; 363/146, 363/841, 129, 53, 147; 307/28, 29, 38, 58, 307/71, 75; 375/220, 377, 219, 258; 29/825, 29/832, 840, 841
See application file for complete search history.

(56) References Cited

U.S. PATENT DOCUMENTS

| | | | | |
|---|---|---|---|---|
| 4,538,073 | A * | 8/1985 | Freige et al. | 307/33 |
| 4,565,430 | A | 1/1986 | Grunwald | |
| 5,689,413 | A * | 11/1997 | Jaramillo et al. | 363/146 |
| 5,864,478 | A * | 1/1999 | McCutchan et al. | 363/147 |
| 5,903,182 | A * | 5/1999 | Jordan | 327/540 |
| 6,348,744 | B1 | 2/2002 | Levesque | |
| 6,392,899 | B1 * | 5/2002 | Harrison et al. | 361/803 |
| 6,486,568 | B1 | 11/2002 | King et al. | |
| 6,556,097 | B1 * | 4/2003 | Coffey | 333/24 R |
| 6,607,307 | B1 | 8/2003 | Gilliland et al. | |
| 6,658,730 | B1 * | 12/2003 | Harrison et al. | 29/832 |
| 6,667,864 | B1 * | 12/2003 | Bedouet et al. | 361/18 |
| 2004/0070950 | A1 | 4/2004 | Higashitani et al. | |

FOREIGN PATENT DOCUMENTS

| | | |
|---|---|---|
| EP | 1187298 | 3/2002 |
| JP | 07200080 | 8/1995 |

* cited by examiner

*Primary Examiner*—Michael Datskovskiy

(57) ABSTRACT

An assembly comprises a voltage regulator module and a field-pluggable voltage converter module configured in an arrangement that interlocks with and optionally attaches to the voltage regulator module.

19 Claims, 11 Drawing Sheets

MODULAR VOLTAGE REGULATOR

BACKGROUND OF THE INVENTION

Economic and competitive conditions create incentive for business organizations to improve operations to reduce costs, including inventory costs. Operations can be improved in fields of advancing technology by focusing design and development resources in areas that improve competitive advantage while leveraging costs of other product aspects across multiple products.

Cost leveraging enables aggregation of component demand across possibly many products leading to improved economies of scale, aggregate volume discounts, and reduction of supplier prices. Component leveraging and re-use also can reduce supply chain, handling, and inventory costs since component sorting, labeling, and tracking are reduced.

Component leveraging can reduce costs in other areas. For example, usage of a particular component in multiple products can avoid duplication of research and development costs. A reduction in the number of components can reduce the incidence of confusion and errors by inadvertently including an incompatible component in a product.

In a high-volume producer, inventory handling and tracking costs can be reduced by millions of dollars simply by aggregating components among multiple products.

SUMMARY

In accordance with an embodiment of an electronic apparatus, an assembly comprises a voltage regulator module and a field-pluggable voltage converter module configured in an arrangement that interlocks with and optionally attaches to the voltage regulator module.

BRIEF DESCRIPTION OF THE DRAWINGS

Embodiments of the invention relating to both structure and method of operation, may best be understood by referring to the following description and accompanying drawings whereby.

DETAILED DESCRIPTION

One aspect of an electronic system or device that may be adapted for usage in multiple products or product lines is a power converter assembly.

Figure 1A:
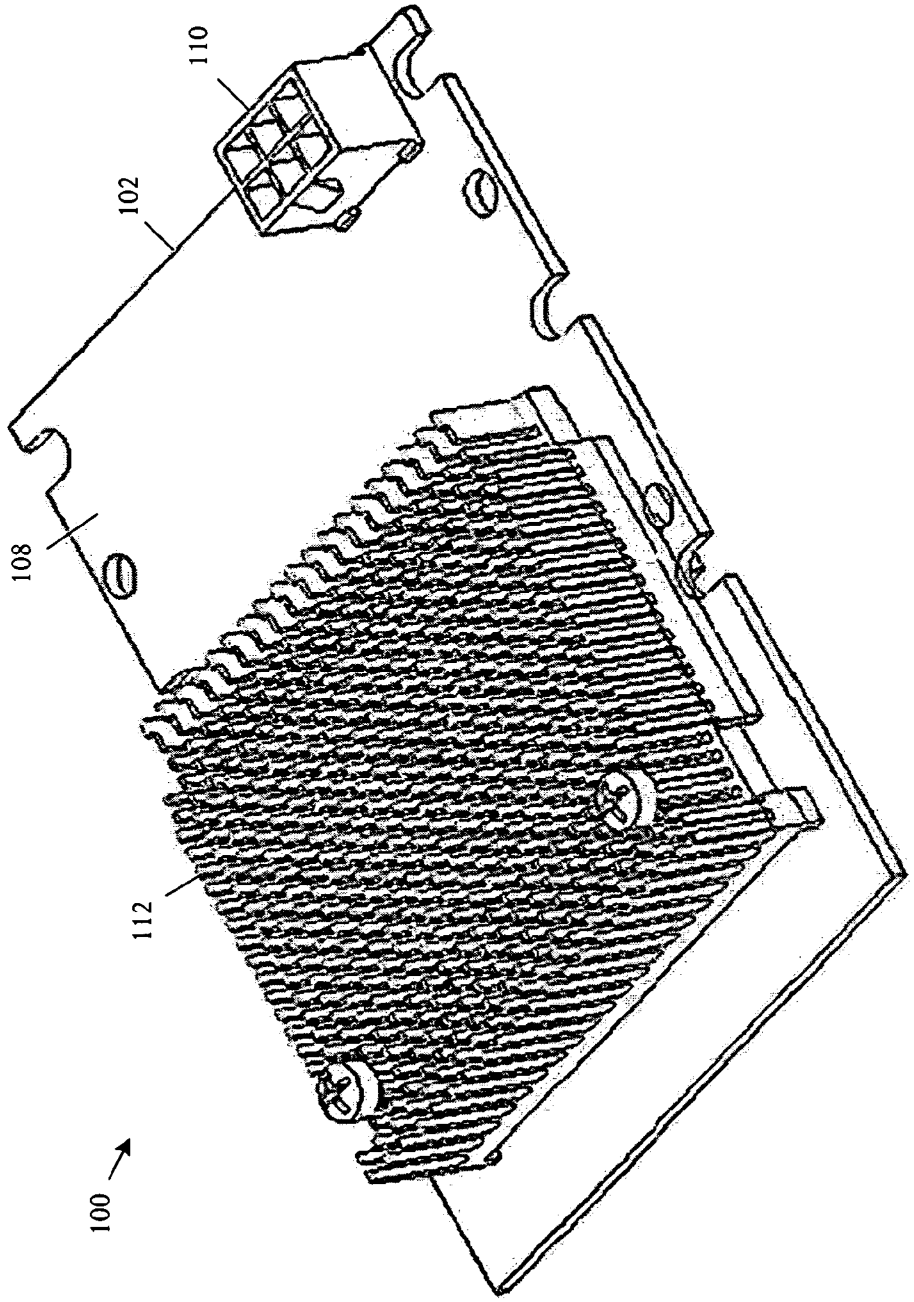
FIGS. 1A, 1B, and 1C are perspective pictorial views depicting an embodiment of a modular power converter respectively including a base voltage regulator module functional at a first voltage, the base module with an additional converter to accommodate operation at a second voltage, and the base module and converter in combination with a component and frame.
Figure 1B:
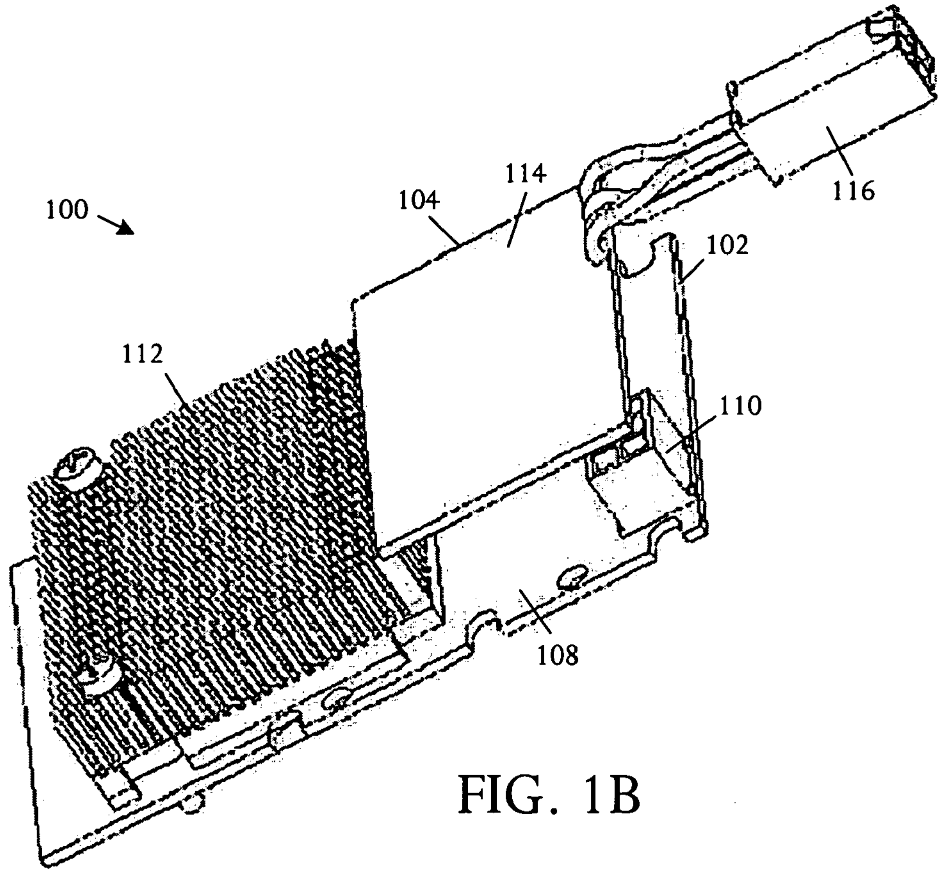

Referring to FIGS. 1A and 1B, two perspective pictorial diagrams illustrate an embodiment of an electronic apparatus 100 adapted for usage as a modular power assembly. The power assembly 100 comprises a voltage regulator module 102 and a field-pluggable voltage converter module 104. The voltage converter module 104 is configured in an arrangement that interlocks with and optionally attaches to the voltage regulator module 102. FIG. 1A shows a modular voltage regulator module 102 alone. The voltage regulator module 102 supplies power to a component, for example a central processing unit (CPU) or any of a multitude of various component types.

The illustrative embodiment of the voltage regulator module 102 includes a voltage regulator circuit coupled to a printed circuit board 108, a first voltage (X) input terminal 110, and a heat sink 112.

In typical usage, the voltage regulator module 102 regulates power from a first particular voltage, generally an appropriate voltage for a first system. FIG. 1B shows the voltage converter module 104 attached to the voltage regulator module 102. The voltage converter module 104 can be attached to the voltage regulator module 102 to enable the power assembly 100 to be used to supply power from a second particular voltage which is an appropriate voltage for a system.

The illustrative voltage converter module embodiment 104 includes a Y-X voltage converter circuit coupled to a printed circuit card 114 and a second voltage (Y) input terminal 116.

In a particular illustrative example, a base voltage regulator module 102 regulates power to 12 volts. The voltage converter module 104 converts from another direct current (DC) voltage, in the particular example 48 volts, to 12 volts and supplies the 12 volts to the voltage regulator module 102. The voltage converter module 104 can be a simple and inexpensive, add-on "field-pluggable" module that enables one base part, the voltage regulator module 102, to be used in multiple platforms. The voltage converter module 104 is typically a smaller, less expensive, secondary part that can be added, if appropriate, to accommodate usage in different platforms.

The voltage regulator module 102 and voltage converter module 104 can be packaged in combination and issued a single inventory part number, increasing inventor efficiency and reducing handling costs.

Figure 1C:
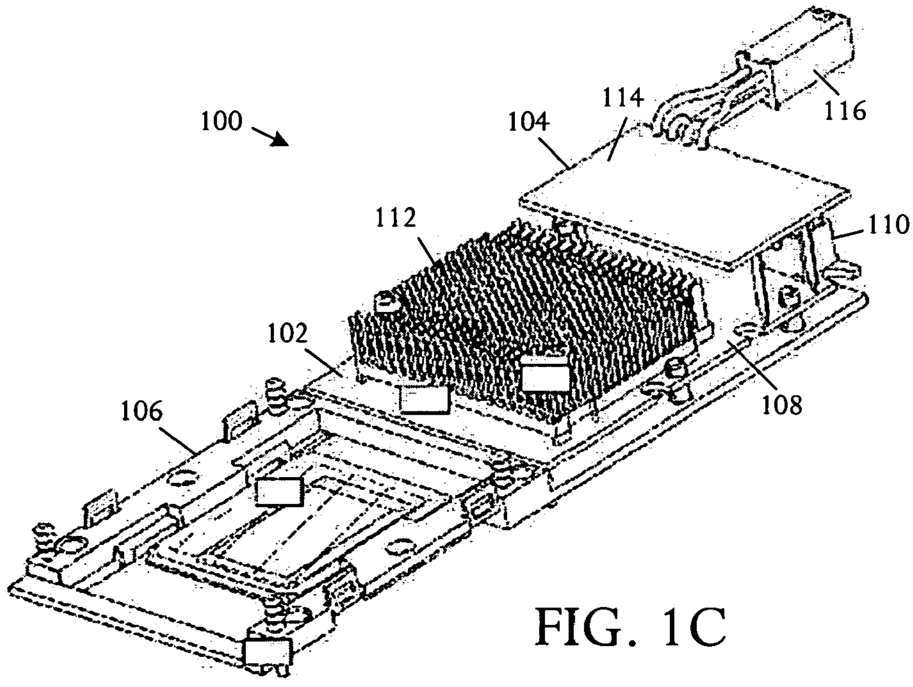

Referring to FIG. 1C, a perspective pictorial diagram illustrates an embodiment of the electronic apparatus 100 that further includes a component frame 106. The component frame 106 may be configured in an arrangement that interlocks with and convertibly attaches to the voltage regulator module 102. In some embodiments, the voltage regulator module 102, voltage converter module 104, and component frame 106 may be packaged in combination and issued a single inventory part number.

Figure 2:
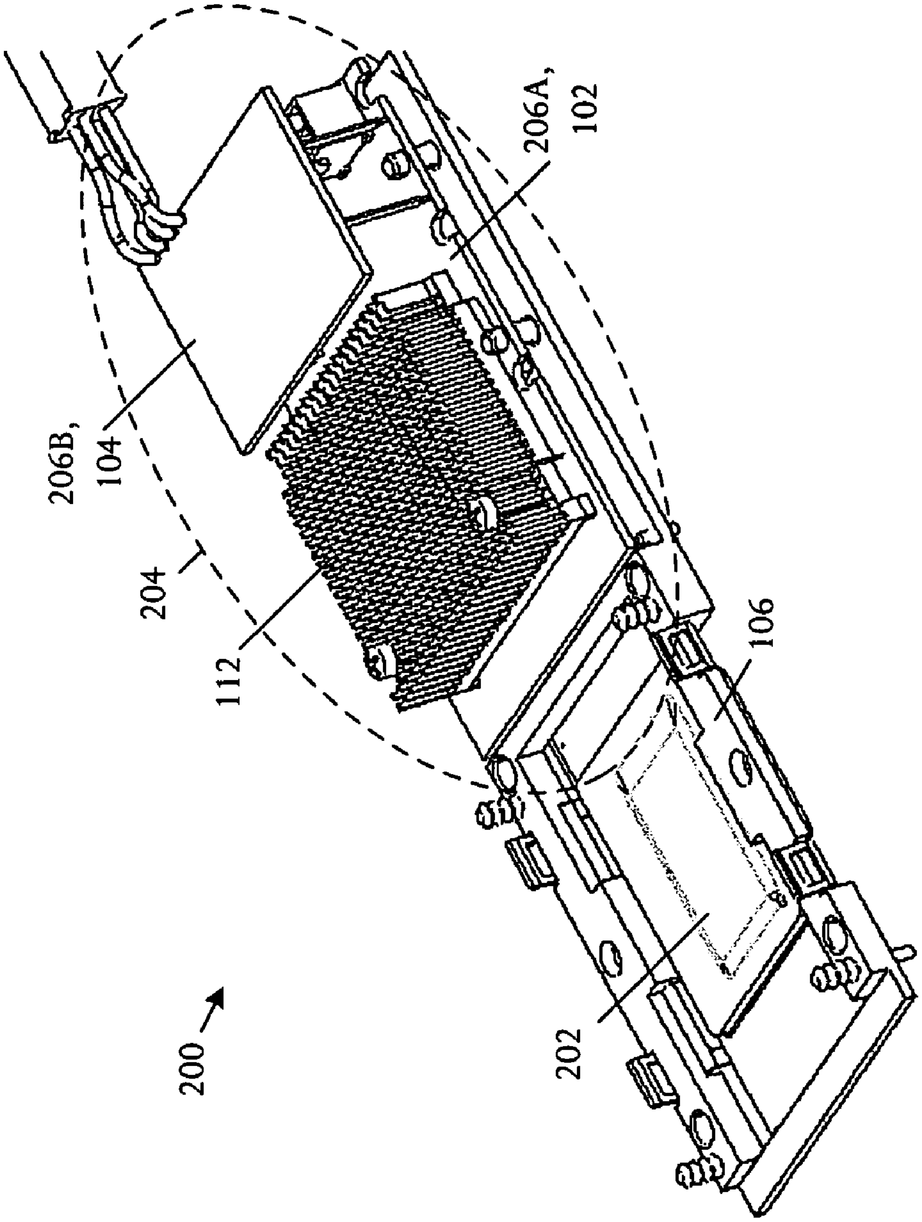
FIG. 2 is a perspective pictorial diagram illustrating an embodiment of an electronic system that includes a modular power converter.

Referring to FIG. 2, a perspective pictorial diagram illustrates an embodiment of an electronic system 200 that includes a modular power converter. The electronic system 200 comprises an electronic component 202 adapted to operate at an operating voltage and a power package 204. The power package 204 is adapted to receive the electronic component 202 and comprises at least two functional units 206A and 206B. The functional units 206A and 206B include a functional unit, for example unit 206B, that is selectively included or omitted from the power package 204 to supply the operating voltage appropriate for the electronic component 204.

In the illustrative embodiment, the power package 204 includes a voltage regulator module 102 and a voltage converter module 104 which, in combination, may be handled as a single inventory part number. Accordingly, the power package 204 can be a combination of the voltage regulator module 102 and the field-pluggable voltage converter module 104 with the voltage converter module 104 having a structure and form suitable to convertibly attach to the voltage regulator module 102.

The modular voltage regulator module 102 supplies power to a central processing unit (CPU) or other component. A base model of the power package 204 uses X voltage, for example 12 volts, and omits the voltage converter module 104. A converted model of the power package 204 attaches a simple and inexpensive, add-on field-pluggable voltage converter module 104 that converts from a different direct current (DC) Y voltage, in one example 48 volts, to the X voltage of 12 volts, and supplies the converted voltage into the base voltage regulator module 102. The power package 204 can be used in multiple platforms, attaching the voltage converter module 104, when appropriate, to accommodate usage in the different platforms.

In some embodiments, the power package 204 may also include a component frame 106 adapted for attachment to the voltage regulator module 102. The component frame 106 has a shape and structure suitable for attaching an electronic component, for example the CPU.

The illustrative power package 204 may be used to arrange an electronic system, for example in manufacturing or assembly, by supplying a voltage regulator module 102, and supplying a field-pluggable voltage converter module 104. The voltage converter module 104 is configured in an arrangement that interlocks with the voltage regulator module 102 and can selectively be included or omitted from the assembly.

The voltage regulator module 102 and the voltage converter module 104 may be packaged in combination as a power package 204 and may be handled as a single inventory part number, enabling improved component compatibility across product lines. Storage and handling of the power package 204 may also lower costs by reducing the number of different field-replaceable-units to be stocked to support a product line that supports different system or platform voltages or power specifications.

During electronic system operation, the power package 204 facilitates regulation of power to the first (X) voltage for usage in a system adapted to operate at the first (X) voltage. The power package 204 also enables selective conversion to a second (Y) voltage for usage in a second system adapted for usage at the second (Y) voltage. In the example application, a power package 204 incorporates a base model voltage regulator module 102 that regulates power to a component from system power at 12 volts in combination with a field-pluggable voltage converter module 104 enabling conversion for usage in a 48 volt system. In a typical application, the power package 204 enables high-end, low-volume 48 volt servers to benefit from the economies of scale of low-end, high-volume 12 volt servers with the addition of only small incremental costs. Accordingly, the power package 204 enables a capability to leverage processors or other components across a product line with different voltage specifications.

In some embodiments, part and inventory count may be further reduced by supplying the component frame 106 with the power package 204 using the component frame 106 configured in an interlocking arrangement with respect to the voltage regulator module 102. Part or inventory count can be further reduced by packaging all components, including the voltage regulator module 102, the voltage converter module 104, and the component frame 106 in combination as a single inventory part number. Additional components or devices can also be added to the power package 204 to facilitate inventory handling. For example, a heat sink 112 may also be included in the power package 204 to further reduce the count of inventory items.

The illustrative power package 204 and associated method enable usage of a field-pluggable part capable of optional or convertible usage to supply power at an appropriate regulated voltage to an assembly for usage in multiple systems or platforms operating at multiple operating voltages. The illustrative power package 204 further enables packaging of the assembly as a single inventory part number, improving inventory efficiency and reducing inventory costs.

Figure 3A:
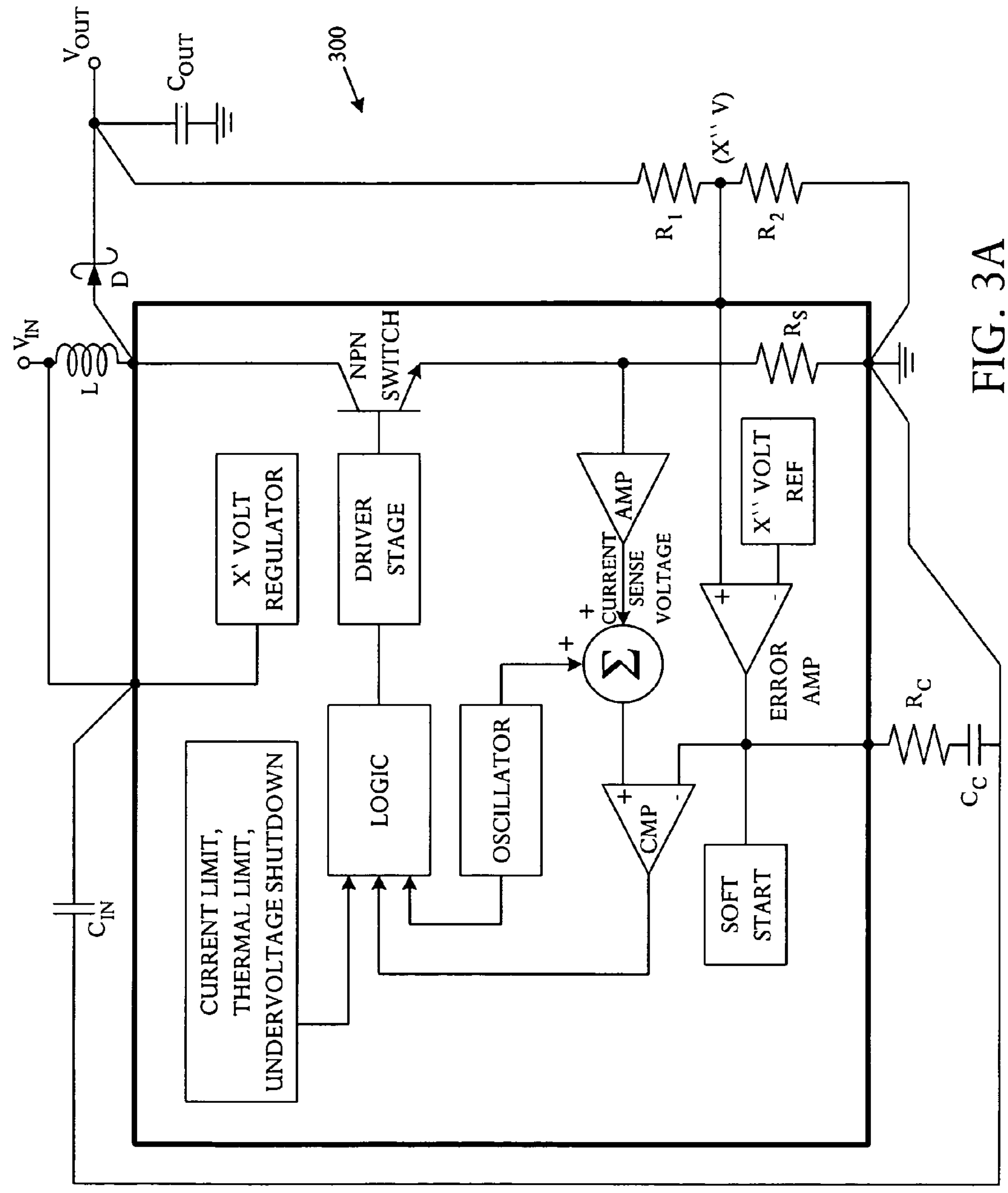
FIGS. 3A and 3B are schematic circuit and block diagrams respectively illustrating embodiments of a voltage regulator circuit and a Y-X voltage converter circuit that may be used in the electronic apparatus and electronic system.
Figure 3B:
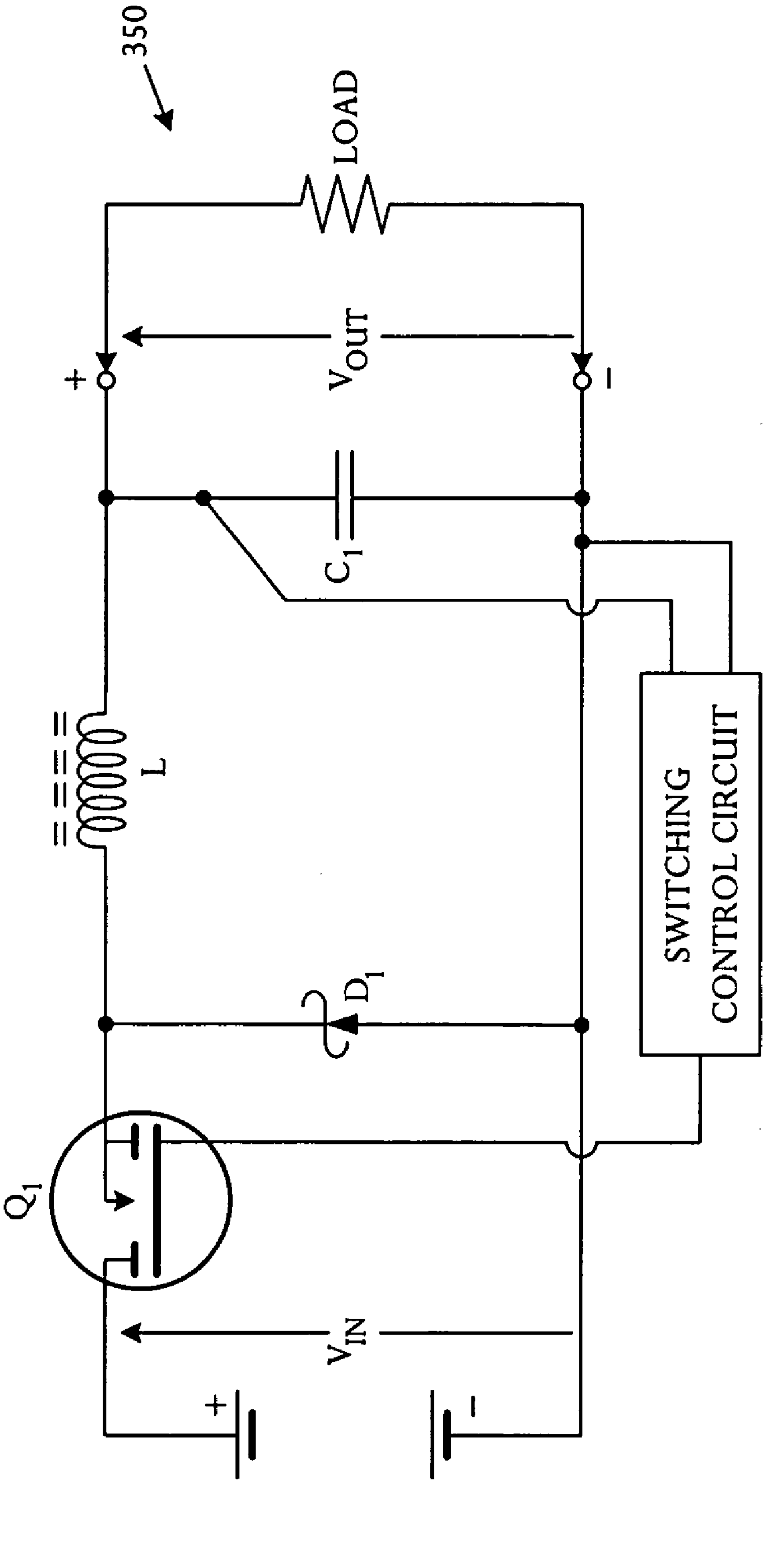

Referring to FIGS. 3A and 3B, schematic circuit and block diagrams respectively illustrate embodiments of a voltage regulator circuit 300 and a Y-X voltage converter circuit 350 which may be suitable for usage in the electronic apparatus 100 shown in FIGS. 1A–1C and/or the electronic system 200 depicted in FIG. 2. For example, the voltage regulator circuit 300 may be coupled to the printed circuit board 108 and the Y-X voltage converter circuit coupled to the printed circuit card 114.

Although any suitable voltage regulator may be used, FIG. 3A illustrates an example of a regulator circuit. The voltage regulator produces a regulated output voltage at a magnitude dependent on the input voltage and the various components in the circuit. For example, the output voltage may be the same as the input voltage or may be an elevated or reduced voltage, if desired. The voltage regulator activates and deactivates the NPN switch at a frequency determined by the oscillator, creating energy in inductor L. When NPN switch is activated, the inductor current charges at a rate of $V_{IN}/L$, storing current in inductor L. When the switch deactivates, the lower end of the inductor L rises to a voltage above $V_{IN}$, discharging current through diode D into output capacitor $C_{OUT}$ at a rate of $(V_{OUT}-V_{IN})/L$. Energy stored in the inductor when the switch is activated is transferred to the output terminal during the switch deactivation time. The output voltage $V_{OUT}$ is controlled by the amount of energy transferred which is controlled by modulating peak inductor current. The modulation takes place by feeding back a portion of the output voltage to an error amplifier which amplifies the difference between the feedback voltage and a reference. Error amplifier output voltage is compared to a voltage proportional to the switch current. The comparator terminates switching when the compared voltages are equal, controlling peak switch current to maintain a constant output voltage.

Referring to FIG. 3B, a schematic mixed circuit and block diagram illustrates an embodiment of a voltage converter circuit 350 that may be suitable for usage in the electronic apparatus 100 and electronic system 200. The voltage converter circuit is a DC-DC converter used to efficiently convert direct current (DC) electrical power from one voltage level to another. The voltage converter functions by changing input energy into a different impedance level. The illustrative circuit is a Buck type DC-DC converter and includes a switching power metal oxide semiconductor field effect transistor (MOSFET) $Q_1$, a flywheel diode $D_1$, inductor L, and an output filter capacitor $C_1$. A switching control circuit monitors and maintains output voltage $V_{OUT}$ at a predetermined level by switching MOSFET $Q_1$ at the converter's fixed operating frequency, although with a varying duty cycle. When MOSFET $Q_1$ is ON, current begins flowing from an input voltage source $V_{IN}$ through MOSFET $Q_1$ and inductor L, to capacitor $C_1$ and the LOAD. The inductor's magnetic field increases, storing energy in inductor L with the voltage drop across L opposing part of $V_{IN}$. When MOSFET $Q_1$ is OFF, inductor L opposes any reduction in the current by reversing electromagnetic field (EMF) and supplies current to the LOAD via diode $D_1$. The DC output voltage $V_{OUT}$ across the LOAD is a fraction of $V_{IN}$, the fraction being the duty cycle.

Figure 4A:
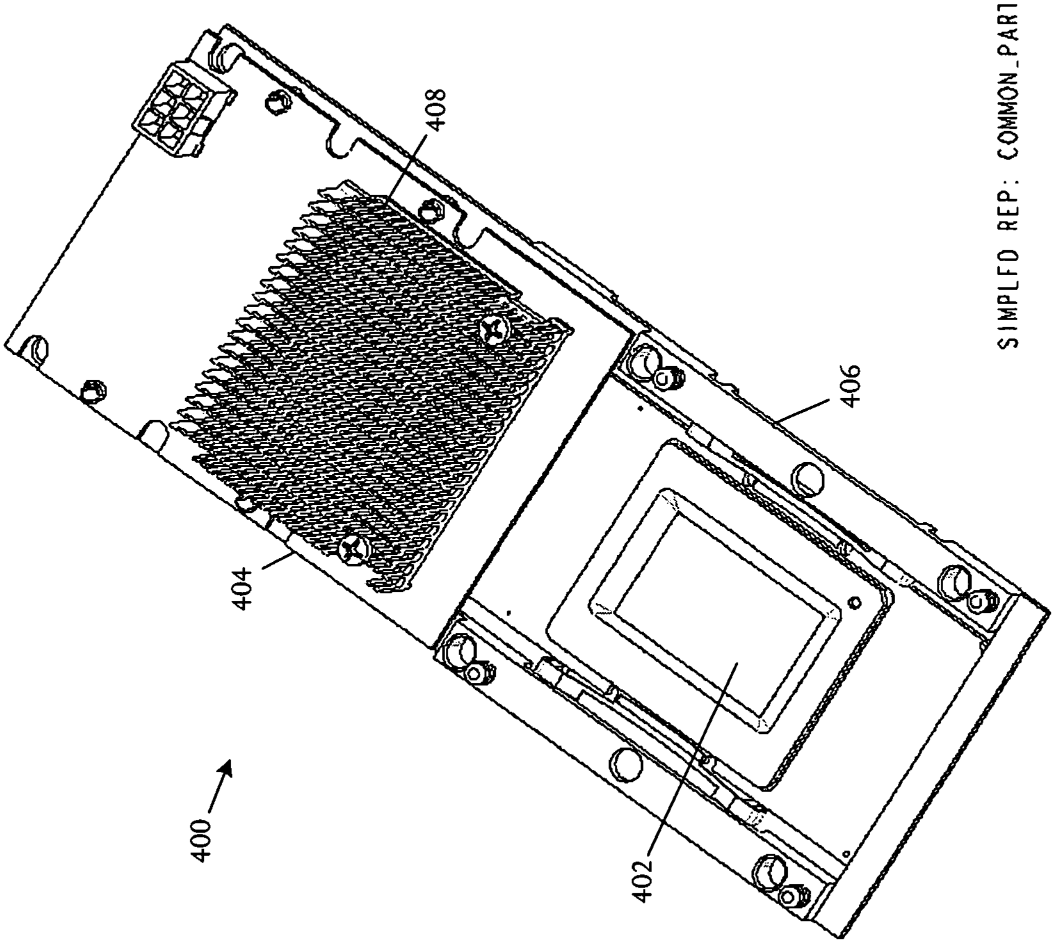
FIGS. 4A–4F are pictorial diagrams illustrating one or more embodiments of a common modular processor carrier.
Figure 4B:
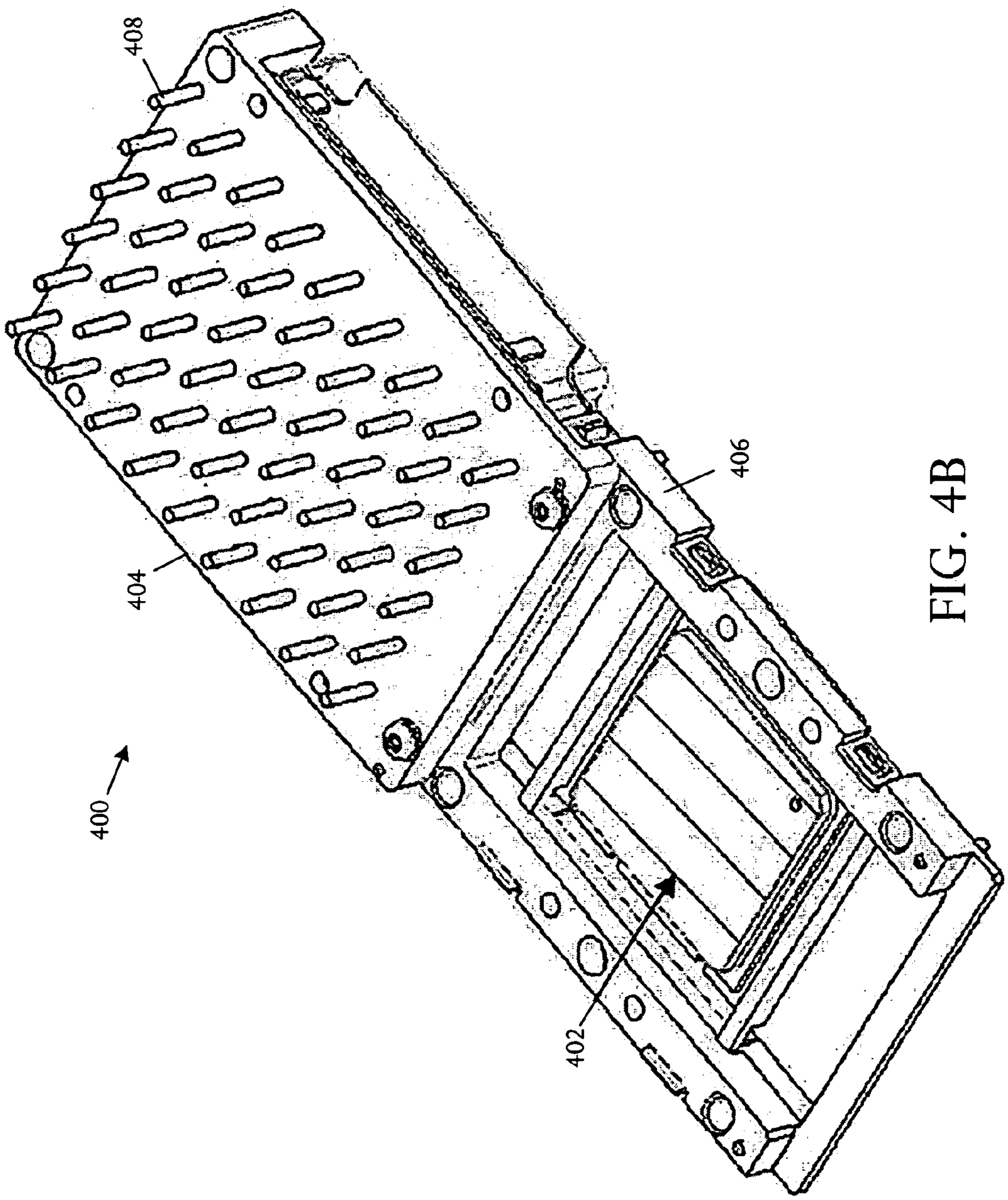
Figure 4C:
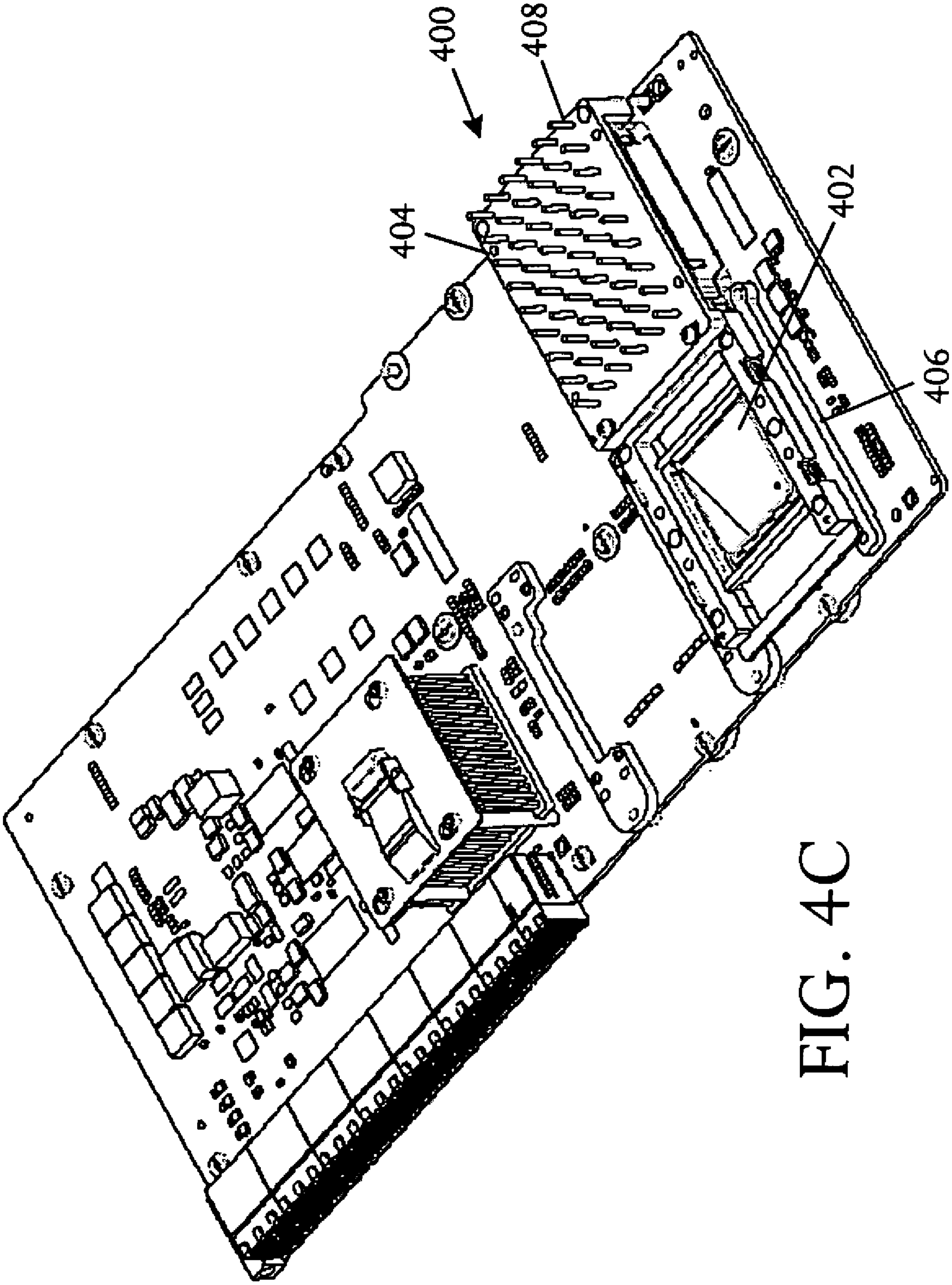
Figure 4D:
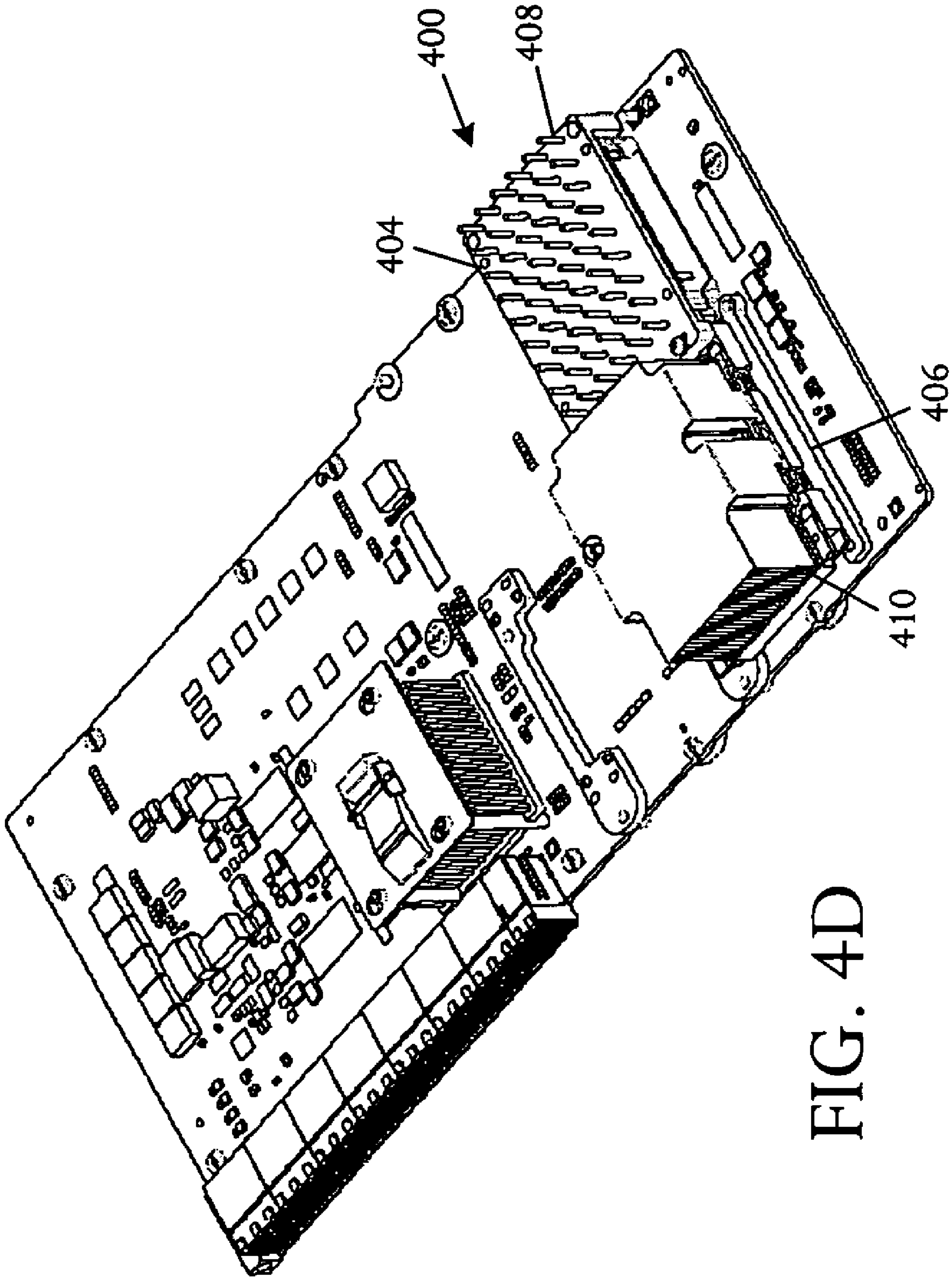

The illustrative modular power assembly 100 and power package 202 may be used in combination with a common modular processor carrier. FIGS. 4A–4E are pictorial diagrams illustrating several embodiments of a common modular processor carrier 400. In one embodiment class, shown in FIGS. 4A, 4B, 4C, and 4D, a processor 402 and power pod assembly 404 have a frame 406 to facilitate insertion into a socket. A power pod 404 is shown in FIGS. 4B and 4C with two different types of heat sinks 408. FIG. 4C shows a power pod assembly 404 with a relatively low cooling capability, including a pin fin heat sink 408. A separate heat sink 410 may be engaged to cool the processor 402 after electrical connection is made to the board. The heat sink 410 may be used as a sequencer plate for the processor 402 and carry structural mounting features for the module. Cooling for the processor 402, which typically has high power consumption, is supplied with a completely separate heat sink, such as the illustrative heat sink 410.

Figure 4E:
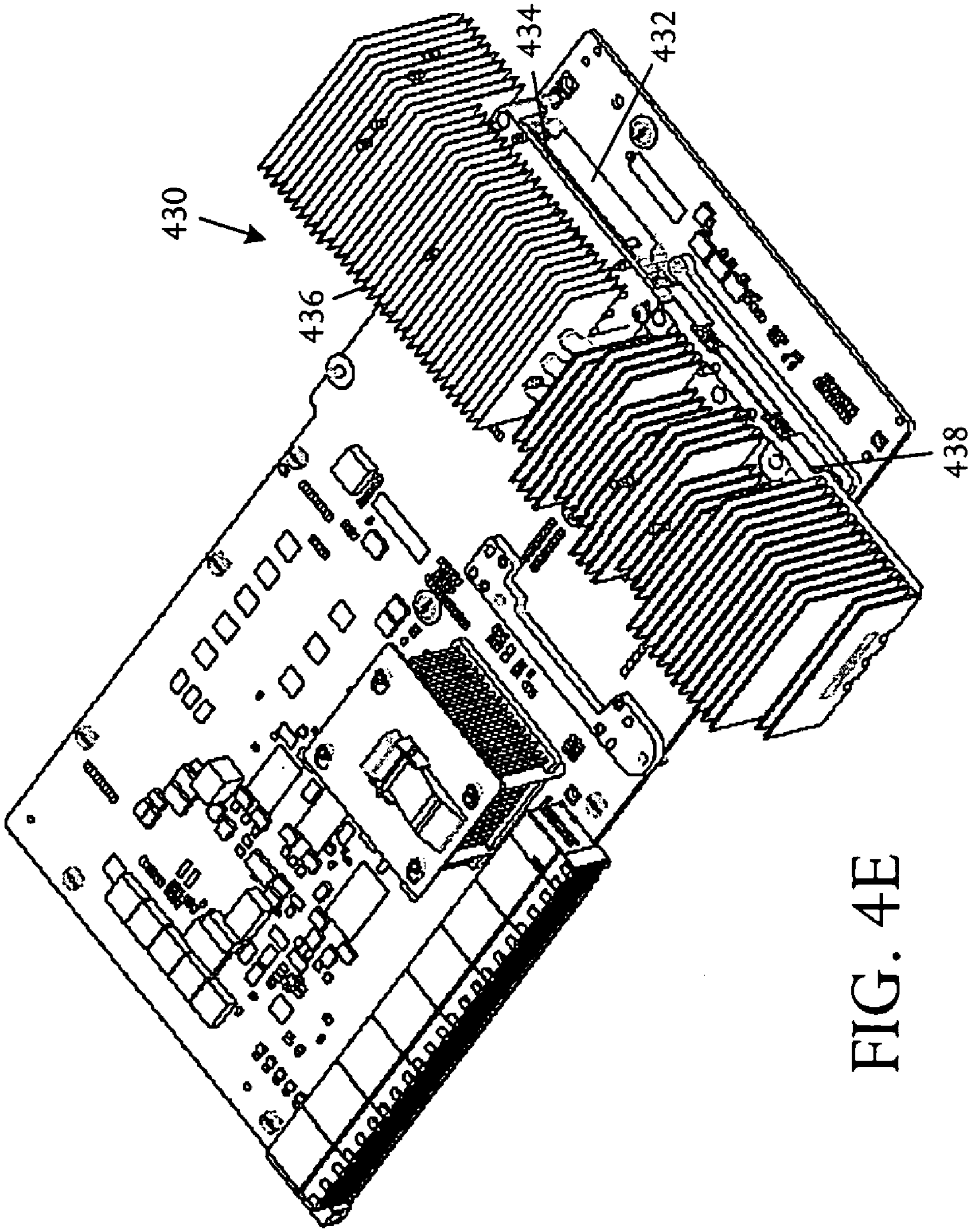
Figure 4F:
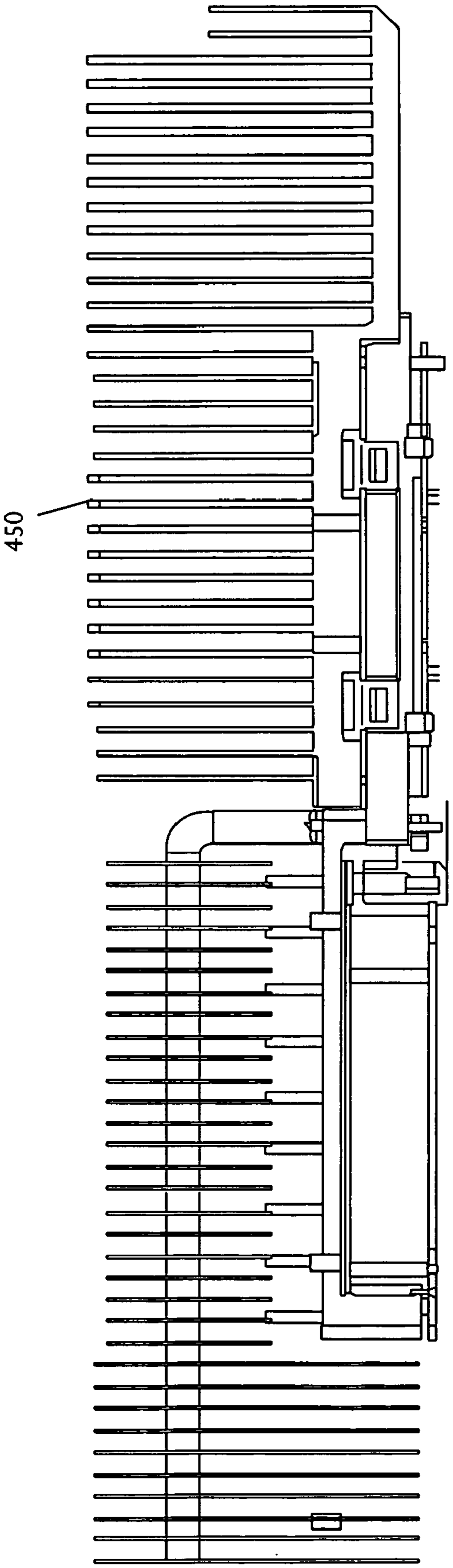

In an embodiment class, shown in FIG. 4E, a power pod assembly 430 and processor are packaged in a module 432 with one common surface 434. A heat sink 436 can have a simple attachment to the module 432 and enable usage of a surface 438 adapted to function as a thermal spreader to spread heat throughout the module 432. In some embodiments, the surface 438 may further include heat pipes that further assist thermal dispersion. FIG. 4F depicts a side pictorial view showing an embodiment of a heat sink 450. The separate heat sink enables a common carrier to be used in multiple products, facilitating cost management in a supply chain.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. For example, components and assemblies with particular structures and geometries are shown. Other examples may have other suitable forms, structures, shapes, and geometries.

In the claims, unless otherwise indicated the article "a" is to refer to "one or more than one".

What is claimed is:

1. An electronic apparatus comprising:
a voltage regulator module; and
a field-pluggable voltage converter module configured in an arrangement that interlocks with and optionally attaches to the voltage regulator module.

2. The apparatus according to claim 1 wherein:
the voltage regulator module regulates power from a first voltage for usage in a first system adapted for usage at the first voltage, and the voltage converter module, when attached to the voltage regulator module, converts the electronic apparatus to regulate power from a second voltage for usage in a second system adapted for usage at the second voltage.

3. The apparatus according to claim 1 further comprising:
packaging containing the voltage regulator module and the voltage converter module in combination as a single product unit.

4. The apparatus according to claim 1 further comprising:
a component frame configured in an arrangement that interlocks with and convertibly attaches to the voltage regulator module.

5. The apparatus according to claim 4 further comprising:
packaging containing the voltage regulator module, the voltage converter module, and the component frame in combination as a single product unit.

6. The apparatus according to claim 1 further comprising:
a heat sink coupled to the voltage regulator module.

7. An electronic system comprising:
an electronic component adapted to operate at an operating voltage; and
a power package adapted to receive the electronic component and comprising at least two functional units, the at least two functional units including a functional unit that is selectively included or omitted from the power package to supply the operating voltage, wherein the power package further comprises;
a voltage regulator module; and
a field-pluggable voltage converter module configured in an arrangement that interlocks with and optionally attaches to the voltage regulator module.

8. The system according to claim 7 wherein the power package further comprises:
a voltage regulator module and a voltage converter module in combination as a single product unit.

9. The system according to claim 7 wherein:
the voltage regulator module regulates power to a first voltage for usage in a first system adapted for usage at the first voltage, and the voltage converter module, when attached to the voltage regulator module, converts the power package to regulate power to a second voltage for usage in a second system adapted for usage at the second voltage.

10. The system according to claim 7 further comprising:
packaging containing the voltage regulator module and the voltage converter module in combination as a single product unit.

11. The system according to claim 7 wherein the power package further comprises:
a component frame configured in an arrangement that interlocks with and convertibly attaches to the voltage regulator module.

12. The system according to claim 7 further comprising:
packaging containing the voltage regulator module, the voltage converter module, and the component frame in combination as a single product unit.

13. The system according to claim 7 wherein:
a heat sink coupled to the voltage regulator module.

14. A method of arranging an electronic system comprising:
providing a voltage regulator module;
providing a field-pluggable voltage converter module; and
configuring the voltage converter module in an arrangement that interlocks with and optionally attaches to the voltage regulator module.

15. The method according to claim 14 further comprising:
packaging the voltage regulator module and the voltage converter module in combination as a single product unit.

16. The method according to claim 14 further comprising:

regulating power to a first voltage for usage in a first system adapted for usage at the first voltage; and selectively converting to a second voltage for usage in a second system adapted for usage at the second voltage.

17. The method according to claim 14 further comprising:

providing a component frame; and configuring the component frame in an arrangement that interlocks with and convertibly attaches to the voltage regulator module.

18. The method according to claim 17 further comprising:

packaging the voltage regulator module, the voltage converter module, and the component frame in combination as a single product unit.

19. The method according to claim 18 further comprising:

attaching a heat sink to the voltage regulator module.

* * * * *

UNITED STATES PATENT AND TRADEMARK OFFICE

CERTIFICATE OF CORRECTION

PATENT NO. : 7,154,754 B2
APPLICATION NO. : 11/027169
DATED : December 26, 2006
INVENTOR(S) : Stephan Karl Barsun et al.

It is certified that error appears in the above-identified patent and that said Letters Patent is hereby corrected as shown below:

In column 6, line 23, in Claim 7, delete "comprises;" and insert -- comprises: --, therefor.

Signed and Sealed this

Twenty-second Day of December, 2009

David J. Kappos

David J. Kappos
*Director of the United States Patent and Trademark Office*